(12) United States Patent
Luharuka et al.

(10) Patent No.: US 9,624,036 B2
(45) Date of Patent: Apr. 18, 2017

(54) SYSTEM AND METHOD FOR MITIGATING DUST MIGRATION AT A WELLSITE

(75) Inventors: Rajesh Luharuka, Katy, TX (US); Galina Gennadievna Petukhova, Moscow (RU); Kim A. Hodgson, Sugar Land, TX (US); Edward Leugemors, Needville, TX (US); Sergey Makarychev-Mikhailov, St. Petersburg (RU); Artem Valeryevich Kabannik, Novosibirsk (RU); Bobby Link, Piedmont, OK (US); Dennis Johnson, Rosenberg, TX (US); Olga Vladimirovna Nevvonen, Tomsk (RU); Megrose Quiterio, Benton, LA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 985 days.

(21) Appl. No.: 13/475,072

(22) Filed: May 18, 2012

(65) Prior Publication Data

US 2013/0309052 A1 Nov. 21, 2013

(51) Int. Cl.
*B65G 3/04* (2006.01)
*B65G 67/00* (2006.01)
(Continued)

(52) U.S. Cl.
CPC ............... *B65G 3/04* (2013.01); *B65G 65/30* (2013.01); *B65G 65/32* (2013.01); *B65G 67/00* (2013.01);
(Continued)

(58) Field of Classification Search
CPC ................ B28C 5/0806; E21B 21/015; E21B 2021/061; E21B 41/00; E21B 15/00; B65G 65/30; B65G 65/32; B65G 67/00
(Continued)

(56) References Cited

U.S. PATENT DOCUMENTS 4,619,531 A * 10/1986 Dunstan ............................ 366/3
4,682,506 A 7/1987 Wienck et al.
(Continued)

FOREIGN PATENT DOCUMENTS

WO 2008139139 A2 11/2008
WO 2010012976 A1 2/2010

OTHER PUBLICATIONS

Charles L. Turner—Air Emissions Testing at an Oilfield Service Company Bulk Storage Facility—SPE46835, prepared for presentation at the 1998 SPE International Conference on Health, Safety and Environment in Oil and Gas Exploration and Production held in Caracas, Venezuela, Jun. 7-10, 1998, pp. 1-10.
(Continued)

*Primary Examiner* — Tony G Soohoo
(74) *Attorney, Agent, or Firm* — Michael L. Flynn

(57) ABSTRACT

A system and method for mitigating dust migration at a wellsite is described. An oilfield material reservoir is provided for receiving oilfield material, the oilfield material reservoir having an enclosure. A dust collector is provided for collecting dust generated at the oilfield material reservoir, and a duct in communication with the enclosure and the dust collector is provided for transferring dust generated at the oilfield material reservoir to the dust collector.

12 Claims, 4 Drawing Sheets

(51) Int. Cl.
*B65G 65/30* (2006.01)
*B65G 65/32* (2006.01)
*E21B 15/00* (2006.01)
*E21B 41/00* (2006.01)
*B65G 69/18* (2006.01)

(52) U.S. Cl.
CPC ............ B65G 69/182 (2013.01); *E21B 15/00* (2013.01); *E21B 41/00* (2013.01)

(58) Field of Classification Search
USPC ............................................................ 366/6
See application file for complete search history.

(56) References Cited

U.S. PATENT DOCUMENTS

| 4,832,498 | A | * | 5/1989 | Milek | 366/27 |
| 5,667,298 | A | * | 9/1997 | Musil | B28C 9/0418 366/17 |
| 6,656,242 | B1 | * | 12/2003 | Golightly et al. | 55/315 |
| 7,837,427 | B2 | | 11/2010 | Beckel et al. | |
| 2002/0001255 | A1 | * | 1/2002 | Flood et al. | 366/8 |
| 2009/0078410 | A1 | | 3/2009 | Krenek et al. | |
| 2011/0162838 | A1 | | 7/2011 | Mackenzie et al. | |
| 2016/0280480 | A1 | * | 9/2016 | Smith | B65G 69/186 |

OTHER PUBLICATIONS

Bridget Hofman, Richard K. Hofman—Silica: Anticipation, Recognition, Evaluation and Control—ASSE Professional Development Conference and Exposition, Jun. 22-25, 2003, Denver, Colorado, pp. 1-8.

Martin Slater, Daniel Perez, Chris Teesdale and Nicholas Hilbig—Unique Offshore Recovery System Dramatically Reduces Environmental Impact by Recycling Stimulation Proppant—SPE81821, Mar. 2003 SPE Drilling & Completion, pp. 5-12.

Gary L Buffington, Randy Mc Burnett—Silica Dust Exposure in the Work Environment—ASSE Professional Development Conference and Exposition, Jun. 11-14, 2006, Seattle, Washington, pp. 1-15.

* cited by examiner

SYSTEM AND METHOD FOR MITIGATING DUST MIGRATION AT A WELLSITE

BACKGROUND

The statements made herein merely provide information related to the present disclosure and may not constitute prior art, and may describe some embodiments illustrating the invention.

In oilfield operations, such as fracturing, cementing, drilling and the like, dusting often occurs when fine particles are used in the operation. For example, during a fracturing operation, proppant (e.g., sand, and other granular or engineered particles) can be pneumatically loaded into an oilfield material delivery vehicle (commonly referred to as a "sand chief") and transferred to a blender to be mixed with fluid (e.g., slickwater, gel, etc.). Dusting can occur during the pneumatic transfer of proppant to the sand chief, during the transfer of proppant from the sand chief compartments to the conveyor, from the conveyor to the hopper, and from the hopper to the blender. These processes are generally open to the atmosphere, and normally do not use any mitigation measure against the migration of dust particles. On a particularly windy day, the dust problem may result in poor visibility at location, health hazards, and clogging of air filters/cooling systems on the engines of surface equipment.

As such, it would be desirable to have a system and method for mitigating dusting at a wellsite.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to one aspect of the present disclosure, at least one embodiment relates to a system for mitigating dust migration at a wellsite. The system comprises an oilfield material reservoir for receiving oilfield material. The oilfield material reservoir is provided having an enclosure. A dust collector is provided for collecting dust generated at the oilfield material reservoir, and a duct in communication with the enclosure and the dust collector is provided for transferring dust generated at the oilfield material reservoir to the dust collector.

According to another aspect of the present disclosure, at least one embodiment relates to a method for delivering oilfield material. The method comprises providing an oilfield material delivery vehicle. The method also comprises transferring oilfield material from the oilfield material delivery vehicle to an oilfield material reservoir via a conveyor. The method further comprises mitigating dust generated during the transfer of oilfield material with a dust collector in communication with an enclosure of the oilfield material reservoir or an enclosure of the conveyor.

However, many modifications are possible without materially departing from the teachings of this disclosure. Accordingly, such modifications are intended to be included within the scope of this disclosure as defined in the claims.

BRIEF DESCRIPTION OF THE DRAWINGS

Embodiments of a system and method for mitigating dust migration at a wellsite are described with reference to the following figures. The same numbers are used throughout the figures to reference like features and components. Implementations of various technologies will hereafter be described with reference to the accompanying drawings. It should be understood, however, that the accompanying drawings illustrate the various implementations described herein and are not meant to limit the scope of various technologies described herein.

DETAILED DESCRIPTION

The discussion below is directed to certain specific implementations for transferring dry materials at or near a wellsite. It is to be understood that the discussion below is only for the purpose of enabling a person with ordinary skill in the art to make and use any subject matter defined now or later by the patent "claims" found in any issued patent herein.

Figure 1:
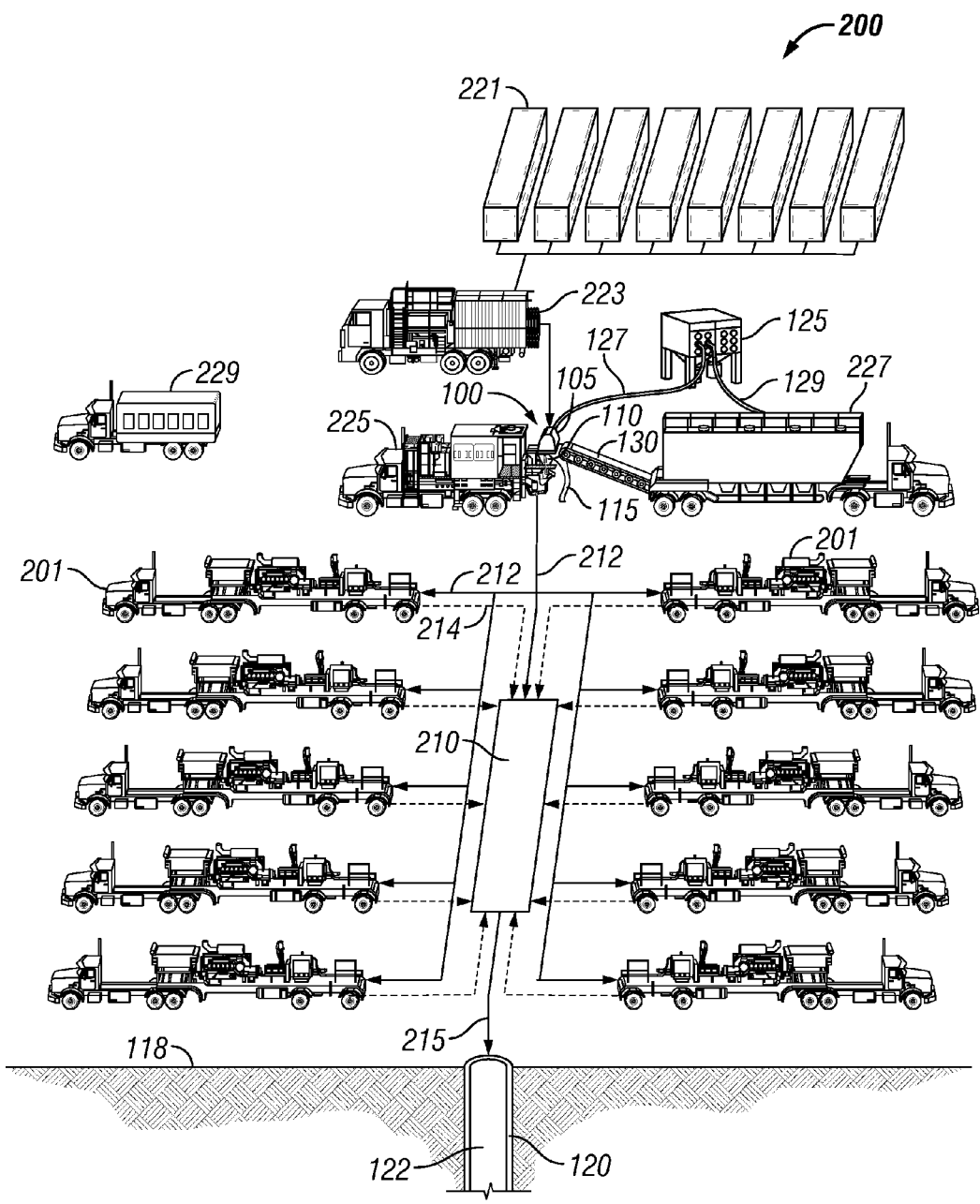
FIG. 1 illustrates a simplified, schematic view of an oilfield operation having a dust control system in accordance with implementations of various technologies and techniques described herein.

FIG. 1 shows a simplified, schematic illustration 200 of an oilfield operation at a wellsite for transferring oilfield material, pumping a fluid from a surface 118 of a well 120, and delivering the fluid to a wellbore 122. In this particular example, the operation depicts a hydraulic fracturing operation, and hence the fluid pumped is a fracturing fluid and slurry. As shown, the operation 200 includes a plurality of water tanks 221, which feed water to a gel maker 223. The gel maker 223 combines water from the tanks 221 with a gelling agent to form a gel. The gel may then be sent to a blender 225 where it is mixed with an oilfield material (e.g., proppant) from a proppant feeder, sand chief, or oilfield delivery vehicle, 227 to form a slurry. Alternatively, water from the tanks 221 may be mixed with a friction reducer and sent directly to the blender 225 to mix with the proppant to form the slurry.

The slurry is then pumped at low pressure (for example, around 60 to 120 psi) from the blender 225 to a plurality of plunger pumps 201 as shown by solid lines 212. At least one of the plunger pumps 201 receives the slurry at a low pressure and discharges it to a common manifold 210 (sometimes called a missile trailer or missile) at a high pressure as shown by dashed lines 214. The missile 210 then directs the slurry from the plunger pumps 201 to the wellbore 122 as shown by solid line 215. As shown, a computerized control system 229 may be employed to direct the entire operation 200.

FIG. 1 also shows a dust control system 100 for controlling, mitigating and/or managing nuisance dust generated during various phases of the oilfield operation. With particular reference to the hydraulic fracturing operation depicted in FIG. 1, for example, the dust control system 100 may be adapted to mitigate dust migration during the loading of proppant into the proppant feeder 227, and during the transfer of proppant from the proppant feeder 227 to the blender 225. More specifically, certain embodiments of the dust control system 100 are adapted to mitigate dust migration during transfer of proppant from a conveyor 130 of the proppant feeder 227 to an oilfield material reservoir, or hopper, 110; and likewise during transfer of the proppant from the hopper 110 to a blending apparatus, or mixer.

The dust control system 100 is depicted as having an enclosure 105 over a substantially open portion of the hopper 110. It should be noted that the term "enclosure" as used herein should not be limited to a volume that is hermetically sealed, as could be construed in various secondary sources. Various embodiments of enclosures as shown and described herein may include, but should not be limited to, a covering or shroud over or around a substantially defined volume wherein air may or may not be allowed to enter and exit. Examples of enclosure construction may include, but again should not be limited to: fabric, plastic, rubber or wiremesh which may be framed and sealed to a substantially defined volume. Additional examples of enclosure construction may include sheet metal surrounding a substantially defined volume.

The dust control system 100 is also shown to have a dust collector 125 in communication with the enclosure 105 and the proppant feeder 227 via hoses 127 and 129. The hoses 127 and 129 may be adapted to work with a vacuum or blower assembly of the dust collector 125 to transfer dust to the dust collector 125 during the various phases of the oilfield operation while preserving the standard operation at the wellsite. Upon transfer of dust to the dust collector 125, the dust collector 125 may be adapted to perform a variety of functions depending on the goals of the operation. For example, the dust may be collected and managed at a later time, the dust may be disposed and shipped away from the wellsite, or the dust may be recycled back into the operation.

The dust collector 125 is shown in FIG. 1 to be an independent system, separate from the blender 225 and the proppant feeder 227 (although connected by hoses 127 and 129). As will be described in detail with reference to various embodiments hereinafter, the dust collector 125 may also be integrated with other wellsite equipment, for example, the blender 225 or the proppant feeder 227. In numerous embodiments described herein, the dust collector 125 may comprise a cyclone-type dust collector, a filter bag type dust collector, a cartridge type dust collector, or the like.

Figure 2:
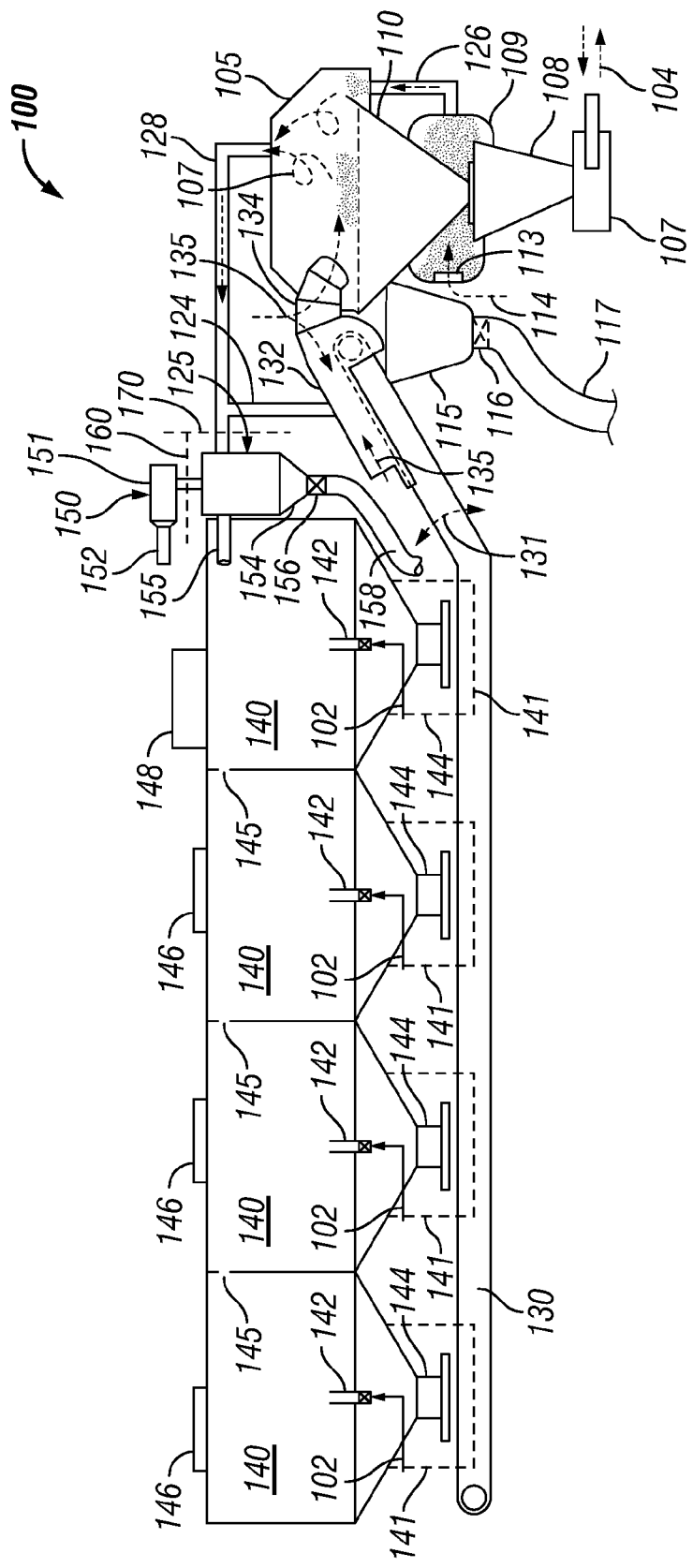
FIG. 2 illustrates a schematic view of a dust control system in accordance with implementations of various technologies and techniques described herein.

Referring generally to FIG. 2, an example of a dust control system 100 is illustrated therein. In this embodiment, the dust control system 100 is designed to provide an integrated approach to collecting, mitigating and/or managing nuisance dust at the wellsite. The dust control system 100 is shown to comprise a dust collector 125 adjoined to at least one compartment 140 of the proppant feeder 227, and in communication with an enclosure 105 of the hopper 110 via a vacuum duct 128. The dust collector 125 may comprise a vacuum assembly 150 adapted to transfer dust generated at or near the hopper 110 to the dust collector 125 for storage and further management. The vacuum assembly 150 may be connected to the dust collector 125 and comprise a fan, or blower, 151 with a vent 152 cooperating with an air conduit 155 and/or the vacuum duct 128 to generate a flow path so as to transfer dust to the dust collector 125. Although the fan 151 is shown to be connected to the dust collector 125 on a clean side 160 of the dust collector 125, the fan 151 may also be connected to the dust collector 125 on a dirty side 170 depending on the type of dust collector 125 employed and the overall goals of the operation.

In at least one embodiment, the enclosure 105 defines a ventilation pathway 135, 107 through which dust and air may flow in an air-flow direction 107. In said embodiment, the vacuum duct 128 is connected to the hopper enclosure 105 so as to create cross-ventilation 107 with respect to an opening 136 (shown in FIG. 3) for air entry 135. The positioning of the vacuum duct 128 is shown to allow air 135 to enter the enclosure 105 and carry dust to the inlet of the vacuum duct 128. Improper placement of the vacuum duct 128, for example, too close to the air entry 135, may not allow generated dust to be removed from the enclosure 105.

Figure 4:
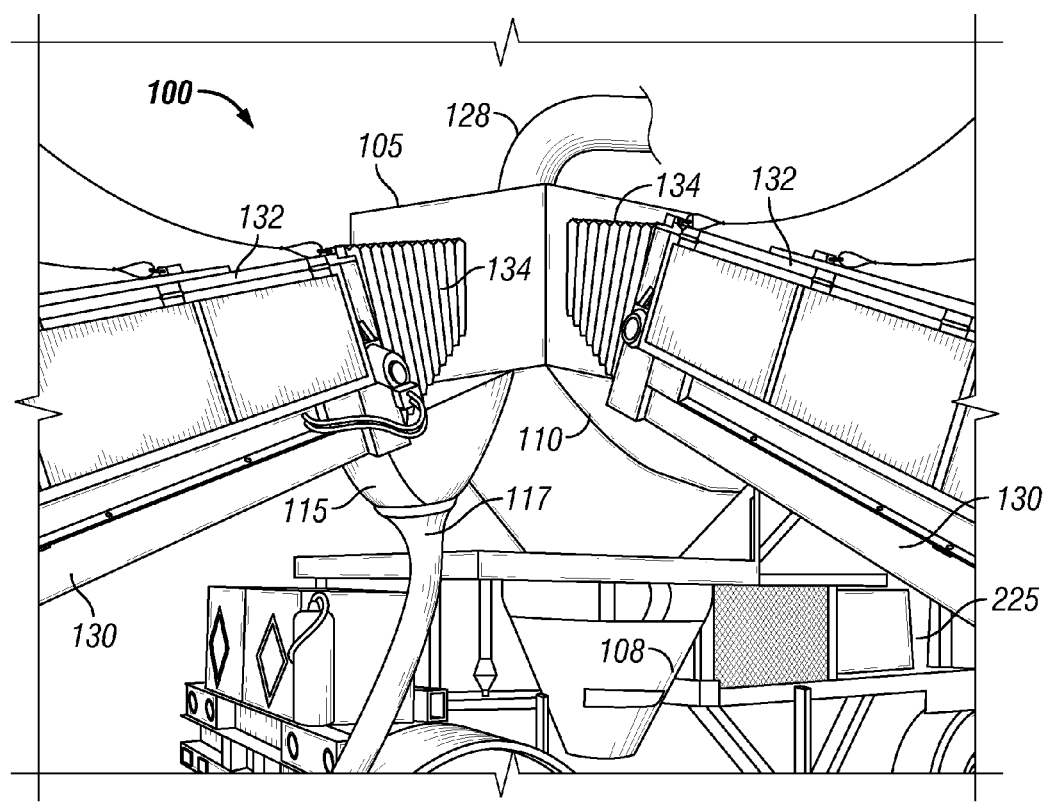
FIG. 4 illustrates a side, elevational view of another embodiment of a dust control system in accordance with implementations of various technologies and techniques described herein.

If management of the collected dust is so desired, the dust collector 125 is shown to include a receptacle 154, valve 156 (e.g., a butterfly valve or the like) and hose 158 for either recycling the dust on the conveyor 130, or disposing the dust in a separate container (not shown). Moreover, dust and other debris may be collected and managed by another receptacle 115, valve 116 and hose 117 located between the conveyor 130 and the hopper 110. As proppant 102 is transferred from the conveyor 130 to the hopper 110, the receptacle 115 is designed to collect falling dust and debris. The hose 117 connected to the receptacle 115, both of which may also be seen in FIG. 4, is shown to be flexible and in the shape of an "elephant nose." The hose 117 may lead the collected dust and debris to a waste container (not shown) for disposal, or may be in communication with the dust collector for storage and further management. Referring back to FIG. 2, the valve 116 is shown between the receptacle 115 and hose 117 to control the dispersion of dust and debris from the receptacle 115. Likewise, the valve 156 shown between the receptacle 154 and hose 158, may also control dispersion of dust collected and stored in the dust collector 125.

The conveyor 130 of the proppant feeder 227 may comprise a conveyor enclosure, or chute, 132 and material transfer guide 134 interfacing between the chute 132 and the hopper enclosure 105. The material transfer guide 134 may be in the form of a flexible, pleated bellow to accommodate movement 131 of the conveyor 130. The bellow 134 is attachable to an opening of the hopper enclosure 105 and may be adapted to guide the proppant 102 into the hopper 110, as well as protect the transferred proppant 102 from cross-winds. In at least one embodiment, the chute 132 may comprise a vacuum duct 124 in communication with the dust collector 125. Although the vacuum duct 124 leading from the chute 132 is shown to connect in a 'T'-shape with the vacuum duct 128 leading from the hopper enclosure 105, it should be understood that each 'system' may be separate and independent. That is, the vacuum duct 124 may be in direct communication with the dust collector 125 so as to transfer dust generated at or near the conveyor 130 to the dust collector 125. Moreover, air 135 may enter the chute 132 and flow in the air-flow direction 107 carrying dust through the duct 128 to the dust collector 125, or carrying dust through the duct 124 to the dust collector 125. In conjunction with the hopper enclosure 105, the chute 132, the bellow 134 and hopper enclosure 105 form a larger enclosure for mitigating dust migration during transfer of proppant 102 to the hopper 110. However, it should be noted that the hopper enclosure 105 may be separate from the chute 132.

As previously mentioned, at least one embodiment of the present disclosure is directed to controlling, mitigating and/or managing nuisance dust generated at or near transfer of the proppant 102 from the hopper 110 to the blending apparatus, or mixer, 108. In particular, dust may be generated during mixing where a high shear mixing component 107 may be used to mix fluid 104 with the proppant 102. The dust control system 100 shown in FIG. 2 depicts a blending apparatus or mixer enclosure 109 between the mixer 108 and the hopper 110 to control mitigation of any dust generated. A vacuum duct 126 is shown as being connected between the mixer enclosure 109 and the hopper enclosure 105 so as to transfer dust to the dust collector 125. Although not explicitly shown in FIG. 2, the vacuum duct 126 may lead directly to the integrated dust collector 125, or to an independent dust collector. The mixer enclosure 109 may comprise an opening 113 to allow air entry 114 in order to allow circulation of air and dust around the volume of space between the mixer 108 and hopper 110, and define a ventilation pathway through which dust and air may flow to the dust collector 125. The opening 113 may comprise grating, fabric or a wiremesh type of material to prevent dust of a certain size from exiting the mixer enclosure 109.

In operation, proppant 102 is pneumatically loaded into at least one compartment 140, and likely multiple compartments 140, of the proppant feeder 227. In loading the compartments 140, air is displaced and may exit the hopper via hatches 146 or through the conduit 155 connected to the dust collector 125. Subsequent to loading proppant 102 into the compartments 140, proppant 102 may be dispersed from a proppant outlet 144 of the compartments 140 directly on the conveyor 130. This dispersion may also generate dust as the conveyor 130 moves at a potentially high rate. In an effort to mitigate dust migration at or near the proppant outlet 144, a dust suppressant 141, in the form of a rubber skirt, may be attached to the outside of the compartment 140. As such, dust may be controlled during the loading of proppant 102 into the proppant feeder 227.

In at least one embodiment of the present disclosure, one of the compartments 140 may comprise a vacuum breaker 148. The vacuum breaker 148 is designed to open the compartment to the atmosphere if a predetermined pressure is reached inside the compartment 140. For example, if a suction or vacuum is created inside the compartment 140, the vacuum breaker 148 may trigger a spring activated latch to open a hatch of the compartment 140 and allow air to enter the compartments 140 thereby equalizing the pressure between the atmosphere and the compartments 140.

Figure 3:
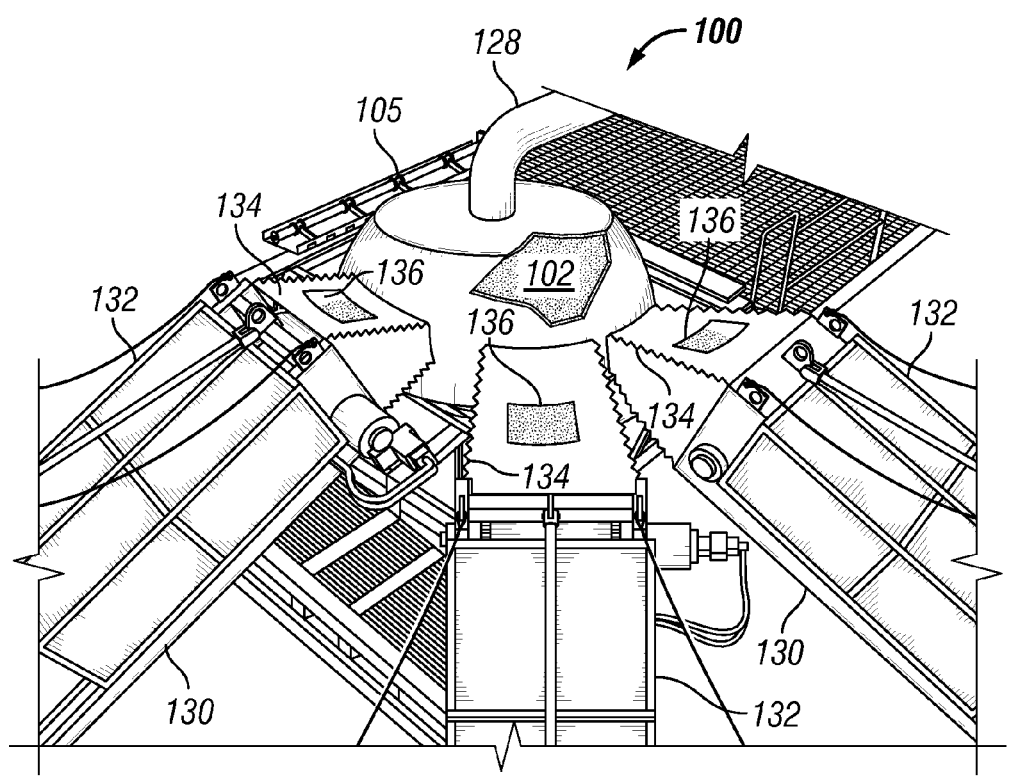
FIG. 3 illustrates a perspective view of another embodiment of a dust control system in accordance with implementations of various technologies and techniques described herein.

Referring generally to FIG. 3, an embodiment of a dust collector system 100 is illustrated. The dust collector system 100 is shown to include an enclosure 105 in communication with a vacuum duct 128, which may be connected to either an independent dust collector 125 or an integrated dust collector 125. FIG. 3 depicts an operation of transferring proppant 102 to the hopper 110 in a manner where nuisance dust is mitigated. The bellow or material transfer guide 134 of each chute 132 is shown to include an opening 136. This opening may be used to allow an operator to view the level of proppant 102 in the hopper 110, and/or to allow air to enter the enclosure 105.

Referring generally to FIG. 4, another embodiment of a dust collector system 100 is illustrated. The hopper enclosure 105 may be of a variety of shapes and sizes to accommodate the operation and the design of the hopper 110. The receptacle 115 is shown in more detail herein to be located between the conveyor 130 and the hopper 110 so as to collect falling dust and debris.

The preceding description has been presented with reference to some embodiments. Persons skilled in the art and technology to which this disclosure pertains will appreciate that alterations and changes in the described structures and methods of operation can be practiced without meaningfully departing from the principle, and scope of this application. For example, the conveyor 130 described herein may be a conveyor belt type system, or may be a pneumatic conveyance type system. Moreover, while the system and method presented herein were described with specific reference to a fracturing operation, it will be appreciated that the dust control system and method may likewise apply to cementing or drilling operations. Accordingly, the foregoing description should not be read as pertaining only to the precise structures described and shown in the accompanying drawings, but rather should be read as consistent with and as support for the following claims, which are to have their fullest and fairest scope.

What is claimed is:

1. A system for mitigating dust migration at a wellsite, comprising:
   an oilfield material reservoir for receiving oilfield material;
   a reservoir enclosure connected to the reservoir to enclose a substantially open portion of the reservoir and configured to mitigate dust migration from the reservoir;
   an oilfield delivery vehicle having at least one compartment for storing the oilfield material;
   a conveyor for transferring oilfield material from the oilfield delivery vehicle to the oilfield material reservoir, the oilfield delivery vehicle comprising at least one dust suppressant for mitigating dust generated during the transfer of oilfield material from the oilfield delivery vehicle to the conveyor;
   a conveyor enclosure connected to the conveyor for mitigating dust migration from the conveyor; and
   a dust collector for collecting dust generated at the oilfield material reservoir and the conveyor, the dust collector in communication, via at least one duct with the reservoir enclosure and the conveyor enclosure, the at least one duct configured to transfer dust generated at the oilfield material reservoir and the conveyor to the dust collector.

2. The system of claim 1 wherein the reservoir enclosure and the conveyor enclosure each define a ventilation pathway through which dust and air flow in an air-flow direction.

3. The system of claim 1 further comprising a blending apparatus in communication with the oilfield material reservoir for mixing the oilfield material with a fluid to form a slurry, wherein the blending apparatus comprises a blending apparatus enclosure configured to mitigate dust migration from the blending apparatus.

4. The system of claim 3 further comprising a duct in communication with the blending apparatus enclosure and the dust collector, the duct configured to transfer dust generated at the blending apparatus to the dust collector.

5. The system of claim 1 further comprising a receptacle between the oilfield material reservoir and the conveyor, the receptacle configured to collect falling oilfield material between the conveyor and the oilfield material reservoir.

6. The system of claim 1 further comprising a material transfer guide between the conveyor enclosure and the reservoir enclosure.

7. The system of claim 6 wherein the material transfer guide comprises a bellows.

8. The system of claim 6 wherein the material transfer guide defines an opening to allow air to enter the reservoir and define an air-flow direction for the system.

9. The system of claim 1 wherein the oilfield material reservoir is configured to receive a proppant.

10. The system of claim 1 wherein the dust collector comprises a vacuum assembly connected to the at least one duct to generate a flow path for transferring dust.

11. The system of claim 1 wherein the dust collector is adjoined to at least one compartment of the oilfield delivery vehicle.

12. The system of claim 1 further comprising a receptacle configured to collect falling dust and debris at a point between the conveyor and the reservoir.

\* \* \* \* \*